United States Patent [19]

Smith

[11] Patent Number: 5,428,491

[45] Date of Patent: Jun. 27, 1995

[54] MAGNETORESISTIVE HEAD WITH DEPOSITED BIASING MAGNET

[75] Inventor: Neil Smith, San Diego, Calif.

[73] Assignee: Eastman Kodak Company, Rochester, N.Y.

[21] Appl. No.: 161,298

[22] Filed: Dec. 3, 1993

[51] Int. Cl.⁶ .............................................. G11B 5/39
[52] U.S. Cl. ................................................. 360/113
[58] Field of Search ....................... 360/113; 324/252; 338/32 R

[56] References Cited

U.S. PATENT DOCUMENTS

| | | | |
|---|---|---|---|
| 3,796,859 | 3/1974 | Thompson | 235/61.11 D |
| 4,277,808 | 7/1981 | Nagaki | 360/113 |
| 4,547,824 | 10/1985 | Best et al. | 360/113 |
| 4,623,867 | 11/1986 | Lundquist et al. | 338/32 R |
| 4,660,113 | 4/1987 | Nomura et al. | 360/113 |
| 4,663,685 | 5/1987 | Tsang | 360/113 |
| 4,755,897 | 7/1988 | Howard | 360/113 |
| 4,899,240 | 2/1990 | McClure | 360/113 |
| 4,903,158 | 2/1990 | Smith | 360/113 |
| 4,907,114 | 3/1990 | Shiiki et al. | 360/113 |
| 4,972,284 | 11/1990 | Smith et al. | 360/113 |
| 4,987,508 | 1/1991 | Smith | 360/113 |
| 5,005,096 | 4/1991 | Krounbi et al. | 360/113 |
| 5,018,037 | 5/1991 | Krounbi et al. | 360/113 |
| 5,021,909 | 6/1991 | Shiiba | 360/113 |
| 5,140,484 | 8/1992 | Maruyama | 360/113 |

FOREIGN PATENT DOCUMENTS 5159247  6/1993  Japan ................................. 360/113

OTHER PUBLICATIONS

Smith et al, *Dual Magnetoresistive Head for Very High Density Recording*, Sep. 1992, IEEE Transactions On Magnetics, vol. 28, No. 5, pp. 2292–2294.

Bajorek et al, *Permanent Magnet Films For Biasing Of Magnetoresistive Transducers*, Sep. 1975, IEEE Transactions On Magnetics, vol. Mag-11, No. 5, pp. 1209–1211.

*Primary Examiner*—Stuart S. Levy
*Assistant Examiner*—William R. Korzuch
*Attorney, Agent, or Firm*—William F. Noval

[57] ABSTRACT

A thin film deposited magnetoresistive head includes a thin film permanent magnet having a rectangular body longer than the magnetoresistive element in the head and arranged coplanar and parallel with the magnetoresistive element. The permanent magnet has a set of tabs that extend in the width direction and the magnetoresistive element is located between the tabs. The magnetoresistive element is effectively biased by the permanent magnet, but the magnet is located at a distance from the head medium interface and is therefore not exposed to environmental corrosion and does not distort the information recorded on the medium.

5 Claims, 3 Drawing Sheets

MAGNETORESISTIVE HEAD WITH DEPOSITED BIASING MAGNET

FIELD OF THE INVENTION

This invention relates to a thin film magnetoresistive reproduce head having a thin film permanent magnet for biasing the magnetoresistive element in the magnetoresistive head.

BACKGROUND OF THE INVENTION

As magnetic recording is pushed to greater storage densities through higher linear densities and narrower track widths, magnetoresistive (MR) reproduce heads are increasingly recognized as the technology of choice. Two technological hurdles presently stand in the way of practical application of MR heads: the establishment of an optimum bias magnetization distribution for linearization of the reproduce signal; and stabilization of domain-wall-free, quasi-single domain magnetization throughout the central (active) region of the MR element. Permanent magnet (PM) biasing methods are particularly attractive in that they require no power dissipation, nor entail any loss of signal due to shunting of the MR sense current.

U.S. Pat. No. 4,903,158 issued Feb. 20, 1990 to Smith, teaches the use of a deposited PM element having the same or nearly the same geometry as the MR element and overlying the MR element. As illustrated in FIG. 2, the MR head, generally designated as 10, includes: (1) a PM element 12 deposited on a substrate (not shown) and magnetized in the direction of arrow A; and an MR element 14 deposited over the PM element on the substrate. In the descriptions of the drawings that follow, the MR head will always be designated 10, the PM element will be designated as 12 and the MR element will be designated 14. The deposited PM element 12 provides a very spatially non-uniform longitudinal stabilization field which complementarily cancels the similarly non-uniform internal demagnetization field of the MR element 14 (which is the fundamental source of single domain instability). The underlying deposited PM element does not apply excessive longitudinal field to the central active area of the MR element 14, which would reduce the reproduce sensitivity of the MR head. A problem with the MR head taught in the '158 patent is that the relatively large magnetic field at the edge of the PM element 12 adjacent the head medium interface can distort the information recorded on the magnetic medium. Yet another problem with the MR head arises because the inhomogeneities in the closely adjacent PM can perturb the magnetic and/or the reproduce properties of the MR element. In addition, the PM head positions the PM adjacent to the planar surface of the MR head. When the PM is in this position, local stray fields from inhomogeneities in the PM film have a degrading effect on the magnetic configuration of the MR element.

U.S. Pat. No. 4,972,284 issued Nov. 20, 1990 to Smith et al teaches an alternative configuration for a deposited PM element which simultaneously provides both a transverse field for establishing a bias magnetization in the MR element, and a unidirectional longitudinal field component for maintaining a domain-wall-free magnetization state in the active region of the MR element. According to the teaching of the '284 patent, the deposited PM element is in the shape of a "C" or "L" and the PM element is coplanar with the MR element. As shown in FIG. 3, the C-shaped PM element 12 is located adjacent and in the same plane as the MR element 14. The PM element 12 is magnetized at an angle $\theta$ with respect to its longitudinal axis, thereby providing both a transverse field for establishing a bias magnetization in the MR element, and a unidirectional longitudinal field component for maintaining a domain-wall-free magnetization state in the active region of the MR element. Since the PM element 12 is located away from the head-medium interface, this geometry has the advantage that the PM element 12 is encapsulated in the integrated head and is therefore not exposed to corrosion at the head-medium interface 16. It has the further advantage that the PM element 12 is located a distance from the head-medium interface 16 and is therefore unlikely to distort the information recorded on the magnetic medium. However, the geometry disclosed in the '284 patent has the drawback that the longitudinal component of the magnetic field produced by the PM element 12 is more uniform along the length of the MR element than is desirable for optimum reproduce sensitivity.

A need has therefore been felt for an improved MR head of the type having a permanent magnet for biasing an MR element in the head that avoids uniformity and provides much larger gradients along the length of the MR element and provides the large bias fields at the ends of the MR element to help stabilize the single domain magnetization state.

SUMMARY OF THE INVENTION

The present invention is directed to overcoming one or more of the problems set forth above. Briefly summarized, according to one aspect of the present invention, a thin film deposited magnetoresistive head has a rectangular thin film magnetoresistive element; a thin film permanent magnet has a rectangular body longer than said magnetoresistive element, and is arranged coplanar and parallel with the magnetoresistive element, the permanent magnet having a first set of end tabs extending in the width direction from the rectangular body, the magnetoresistive element being located between the end tabs such that the permanent magnet provides a magnetic field component parallel to the length of the magnetoresistive element for stabilizing a domain-wall-free magnetization distribution in the magnetoresistive element. In one embodiment of the invention, the permanent magnet further includes a second set of end tabs extending in the width direction away from the magnetoresistive element. In another embodiment, the magnetoresistive element is a dual magnetoresistive element.

The magnetoresistive head, according to the present invention, has the advantages of having improved sensitivity while the permanent magnet layer is located farther away from the head medium interface and is less likely to distort the information recorded on the medium. The medium is also located further away from the MR element and is less likely to perturb it. The PM of the present invention can provide much larger gradients in the longitudinal components of the bias field and large bias fields at the end of the MR element.

DETAILED DESCRIPTION OF THE INVENTION

Figure 1:
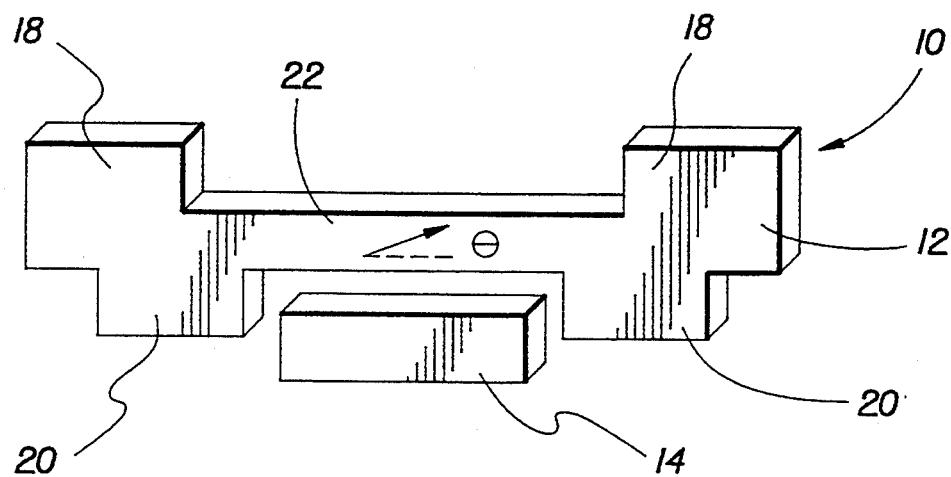
FIG. 1 is a diagram of an MR head having a permanent biasing magnet according to the present invention.
Figure 2:
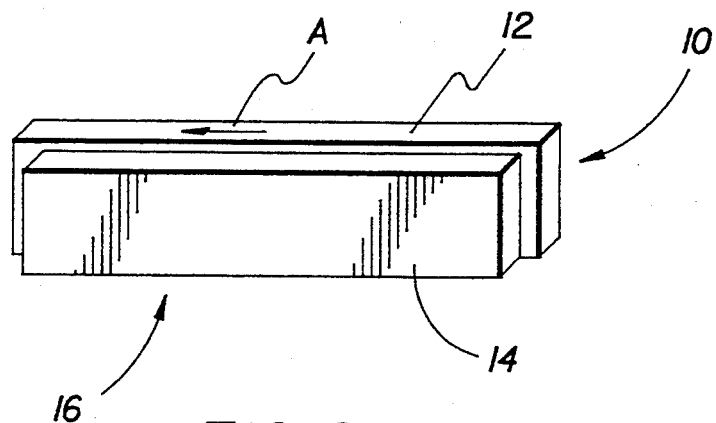
FIG. 2 is a diagram of an MR head having an overlying permanent biasing magnet according to the prior art.
Figure 3:
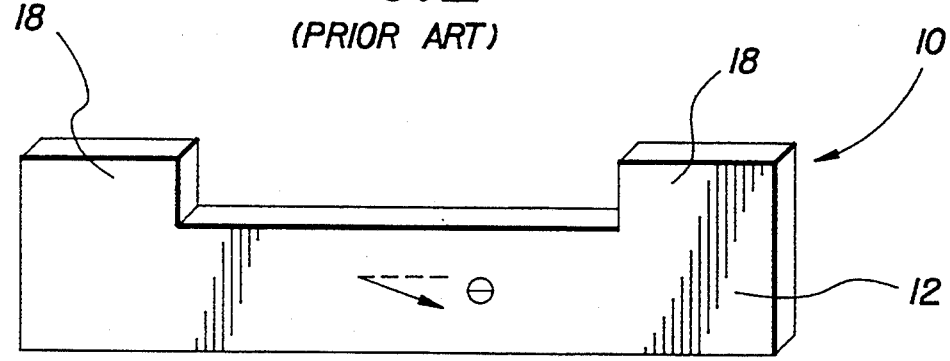
FIG. 3 is a diagram of an MR head having a coplanar biasing magnet according to the prior art.
Figure 3:
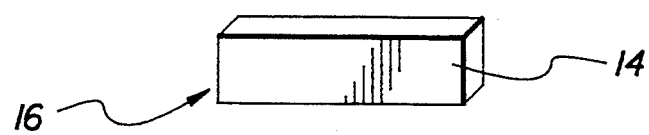

FIG. 1 shows an MR head 10 according to the present invention. The PM element 12 is similar in construction to the prior art PM element 12 shown in FIG. 3, and additionally includes a pair of end tabs 20 that extend from the PM element 12 in a width direction, with the MR element 14 being located between the end tabs 20. The PM element 12 is a magnetically homogenous permanent magnet material that is magnetized at an angle $\theta$ of approximately 45 degrees from its longitudinal axis, thus providing both a transverse and longitudinal component of magnetic field. The end tabs 20 in cooperation with the longitudinal portion 22 of the PM element 12 between the end tabs cause the longitudinal component of the magnetic field to be highly nonuniform (strong at the ends and weak near the middle) along the MR element 14, thereby maximizing the single domain stability of the MR element while minimizing sensitivity loss of the MR head.

Figure 5:
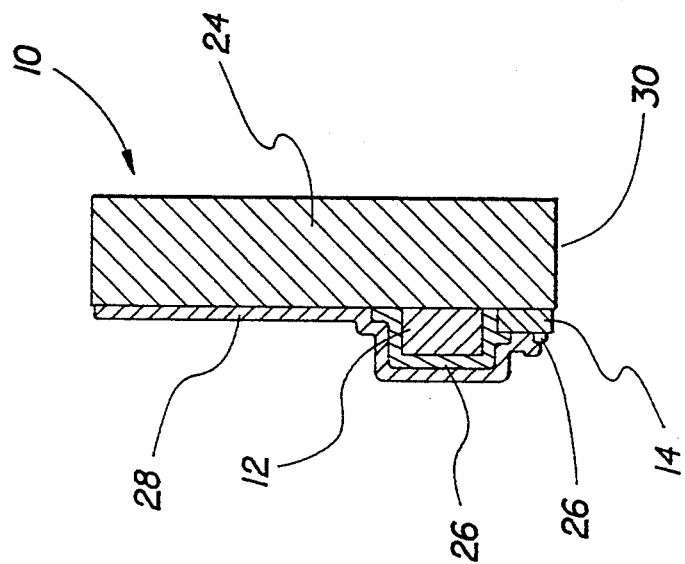
FIG. 5 is a cross sectional view taken along line 5—5 of the MR head shown in FIG. 4.
Figure 4:
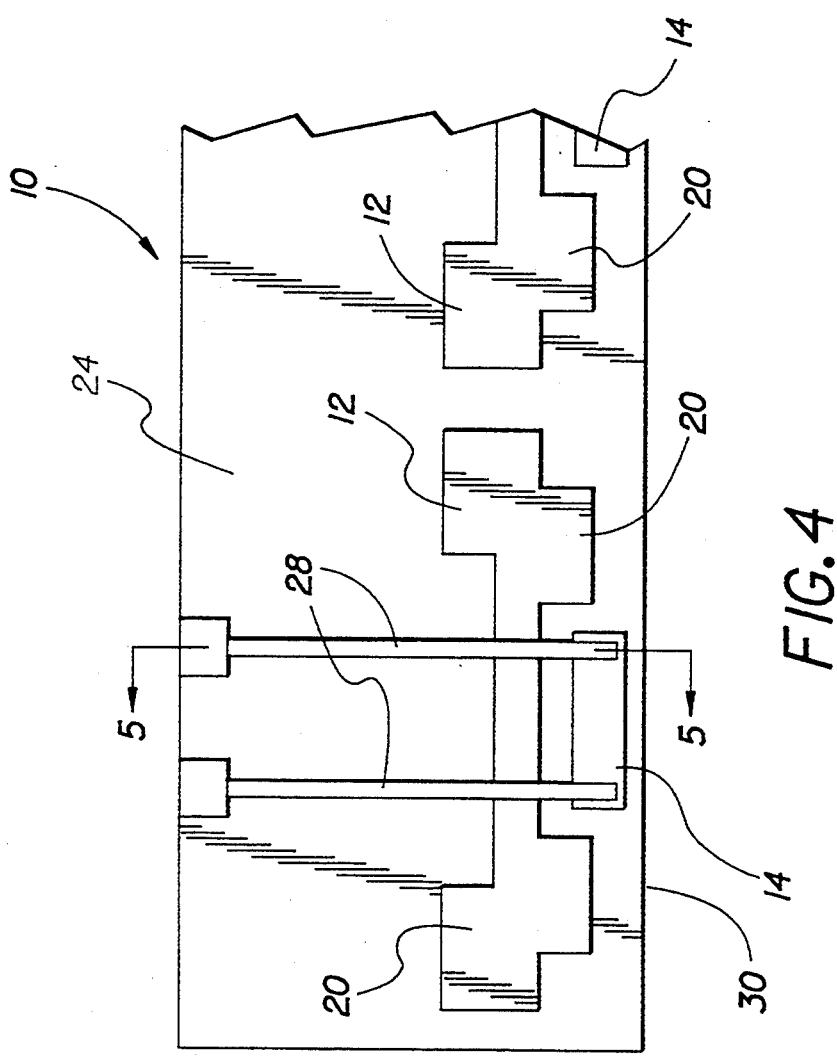
FIG. 4 is a plan view of a portion of a multitrack MR head according to the present invention.

Referring to FIGS. 4 and 5, a portion of a multitrack MR head according to the present invention can include a linear array of MR elements 14, each with its own PM biasing magnet, deposited on a substrate 24. The PM elements 12 are formed using materials such as CoPt or CoSm according to the techniques known in the art. The PM elements 12 may be covered by a thin layer 26 of electrically insulating material such as $SiO_2$. Deposited leads 28 are formed in electrical contact with the MR elements 14 for conducting externally generated sense currents through the MR elements as is well known in the art.

After fabrication, the MR head 10 is placed in a strong external magnetic field which magnetizes the PM elements 12 in the desired direction determined by the direction of the external field. The direction of magnetization is selected to provide the desired magnitudes of hard and easy axis biasing.

Referring to FIG. 5, it can be seen that while the thickness of the MR elements 14 and PM elements 12 may not be of equal thickness, they are both deposited approximately on the common plane of the surface of substrate 24.

Figure 6:
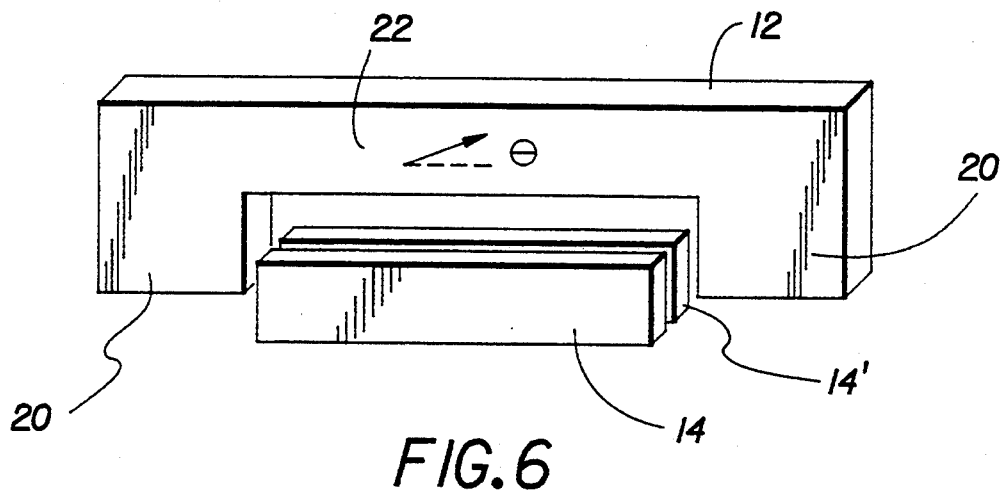
FIG. 6 is a diagram of a dual-magnetoresistive head having a permanent biasing magnet according to the present invention.
Figure 7:
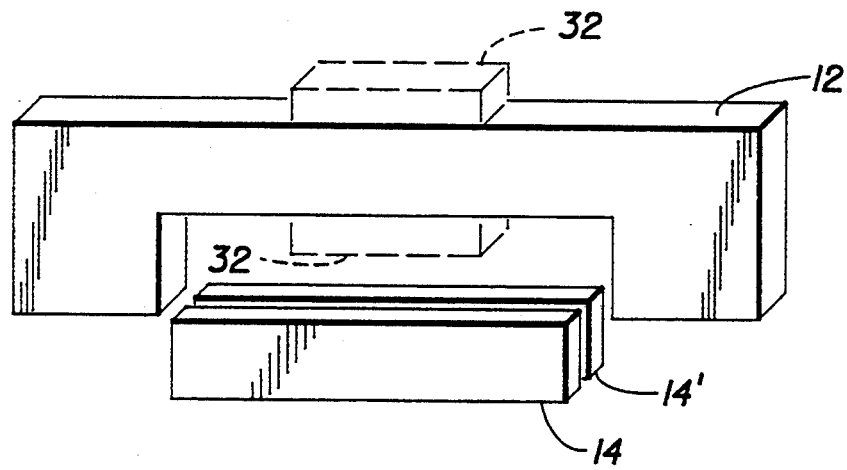
FIG. 7 is a diagram of a dual-magnetoresistive head including a permanent biasing magnet according to the present invention, including a central tab for reducing the longitudinal biasing field near the middle of the dual-magnetoresistive element.

Referring now to FIG. 6, the principle of the present invention is shown applied to a magnetoresistive head of the type known as a dual MR (DMR) head. The DMR head includes a pair of MR elements 14 and 14' that are deposited one on top of the other as taught by U.S. Pat. No. 5,084,795. The sense currents flowing in the DMR elements cause them to mutually bias each other in the hard axis direction. The PM element 12 is employed to bias the MR elements in the easy axis direction. The PM element 12 is magnetized in the longitudinal direction. The end tabs 20 generate a strong longitudinal field at the ends of the MR elements 14 and 14'. A small deviation $\theta$ in the magnetization direction from the longitudinal axis may be incorporated in the PM element 12 to compensate for any thickness mismatch in the MR elements 14 and 14'. The electrical contact leads and insulating layer between the MR elements are not shown in FIG. 6, but are assumed to be provided according to the teachings of the prior art. The elongated central portion 22 of the PM element 12 functions to reduce the strength of the longitudinal field near the center of the MR elements 14 and 14', thereby improving the sensitivity of the DMR head without reducing the effects of instabilities of the strong PM fields at or near the magnetic ends of the MR element. The field near the center of the MR elements can be further reduced by providing an additional tab 32 extending in the width direction as shown in FIG. 7. The tab 32 can extend up and/or down as shown in FIG. 7. As compared with U.S. Pat. No. 4,972,284, the configuration herein disclosed which uses the PM provides much larger gradients in the longitudinal component of the bias field, thereby providing large bias fields at the end of MR elements. These large bias fields help stabilize a single domain magnetization state while, at the same time, not providing a large longitudinal field to the central, i.e., active, portion of the MR elements. A large longitudinal field in the central portion of the MR can substantially reduce the stability.

Figure 8:
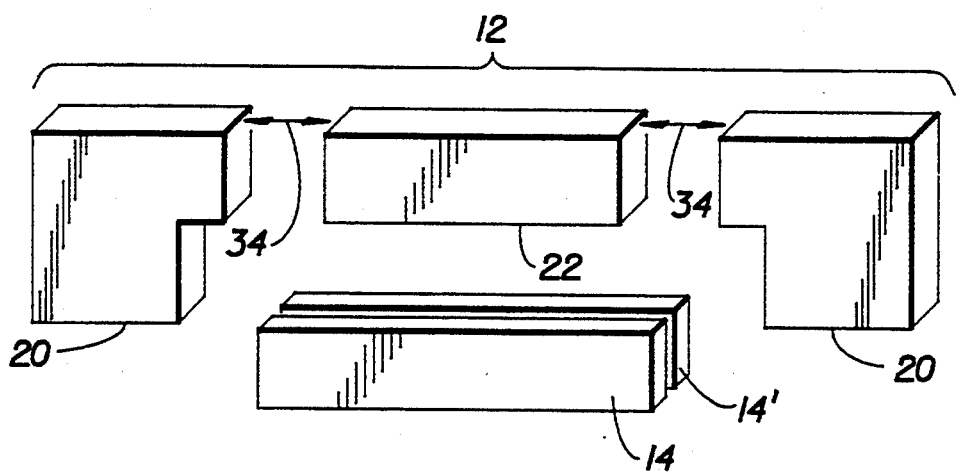
FIG. 8 is a diagram of a dual-magnetoresistive head including a permanent biasing magnet according to the present invention, including a pair of gaps for providing a path for electrical leads.

As shown in FIG. 8, gaps 34 may be provided in the central portion 22 of the PM element 12 to minimize the problem of the current leads shorting to the MR element. However, the passage of the leads through these gaps is optional.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is according intended that the claims shall cover all such modifications and applications as do not depart from the true spirit and scope of the invention.

| Parts List | |
| --- | --- |
| 10 | Magnetoresisitive Reproduce (MR) element |
| 12 | Permanent Magnet (PM) element |
| 14 | MR element |
| 14' | Second MR element |
| 16 | Head-medium interface |
| 18 | Secondary end tabs |
| 20 | End tabs |
| 22 | Elongated central portion |

-continued

| Parts List | |
|---|---|
| 24 | Substrate |
| 26 | Thin layer of electrically insulating material |
| 28 | Deposited leads |
| 32 | Tab |
| 34 | Air gap |

I claim:

1. A thin film deposited magneto-resistive head, comprising:

a. a rectangular thin film magnetoresistive element having a length and width;

b. a thin film permanent magnet having a rectangular body longer than said length of said magnetoresistive element, and arranged to be approximately coplanar and parallel with the magnetoresistive element, said permanent magnet having a first set of end tabs extending in the width direction therefrom and said magnetoresistive element being located between and overlapping at least a portion of said end tabs; and c. said permanent magnet providing a magnetic field bias having a component parallel to the length of said magnetoresistive element which is highly non-uniform with a strong field at each end of said element and a weak field near the middle of said element, for stabilizing a domain-wall-free magnetization distribution in said magnetoresistive element while minimizing sensitivity loss of said element;

wherein said permanent magnet further includes an additional tab extending in the width direction from said permanent magnet and located near the middle thereof, for reducing the strength of the magnetic field near the middle of the magnetoresistive element.

2. The magnetoresistive head claimed in claim 1, wherein said magnetoresistive element is a dual magnetoresistive element and said permanent magnet is magnetized in a direction parallel to the length of the magnetoresistive element.

3. The magnetoresistive head claimed in claim 1, wherein said permanent magnet includes a gap in the central portion of said permanent magnet for reducing the strength of the magnetic field near the middle of said magnetoresistive element.

4. The magnetoresistive head claimed in claim 1, wherein said permanent magnet further comprises a second set of end tabs extending in the width direction opposite to said first end tabs and wherein said permanent magnet further provides a magnetic field component transverse to the length of said magnetoresistive element for biasing said element.

5. The magnetoresistive head claimed in claim 1, wherein said permanent magnet is magnetized in a direction $\theta$ of 45 degrees from the longitudinal axis of said permanent magnet.

* * * * *